United States Patent
Tamme

(10) Patent No.: US 10,322,918 B2
(45) Date of Patent: Jun. 18, 2019

(54) BLOCK

(71) Applicant: Ropeye OÜ, Tallinn (EE)

(72) Inventor: Jaanus Tamme, Tallinn (EE)

(73) Assignee: Ropeye OÜ, Tallinn (EE)

( * ) Notice: Subject to any disclaimer, the term of this patent is extended or adjusted under 35 U.S.C. 154(b) by 0 days.

(21) Appl. No.: 15/726,637

(22) Filed: Oct. 6, 2017

(65) Prior Publication Data
US 2019/0062131 A1 Feb. 28, 2019

(30) Foreign Application Priority Data
Aug. 31, 2017 (EP) ..................... 17020399

(51) Int. Cl.
*B66D 3/04* (2006.01)
*B63H 9/10* (2006.01)

(52) U.S. Cl.
CPC ..................... *B66D 3/04* (2013.01); *B63H 9/10* (2013.01)

(58) Field of Classification Search
CPC ..... B66D 3/04; B66D 3/046; B66D 2700/026
See application file for complete search history.

(56) References Cited

U.S. PATENT DOCUMENTS

| | | | | |
|---|---|---|---|---|
| 230,994 A * | 8/1880 | Bitting | ............... | F16C 17/02 384/276 |
| 360,050 A * | 3/1887 | Redmond | ............ | B66D 3/04 254/412 |
| 1,406,560 A * | 2/1922 | Houghton | ............. | B66D 3/046 254/406 |
| 2,527,350 A * | 10/1950 | Brown | ................ | B66D 3/046 254/406 |
| 2,551,803 A * | 5/1951 | Leonard | ................. | B66D 3/04 294/74 |
| 2,924,431 A * | 2/1960 | Chadbourne | ........... | B66D 3/04 254/409 |
| 4,191,416 A * | 3/1980 | Nist | ....................... | A62B 1/00 254/399 |
| 4,549,723 A * | 10/1985 | Castilano | ............. | B66D 3/046 254/134.3 PA |
| 5,249,543 A * | 10/1993 | Rutgerson | ............. | B66D 3/046 114/108 |
| 8,002,244 B2 | 8/2011 | Curchod | | |
| 8,727,320 B1 * | 5/2014 | Franta | .................. | B66D 3/04 254/389 |
| 9,187,298 B2 * | 11/2015 | DeSoo | ................... | B66D 3/04 |
| 9,975,743 B2 * | 5/2018 | Barnet | .................. | B66D 1/36 |
| 9,988,252 B1 * | 6/2018 | Kunstadt | ............... | B63H 9/10 |

(Continued)

FOREIGN PATENT DOCUMENTS

| | | | | |
|---|---|---|---|---|
| EP | 1004506 A2 * | 5/2000 | ............ | B63H 9/10 |
| FR | 2923451 A1 | 5/2009 | | |
| GB | 2418407 A * | 3/2006 | ............ | B63H 9/10 |

*Primary Examiner* — Emmanuel M Marcelo

(74) *Attorney, Agent, or Firm* — Berggren LLP

(57) ABSTRACT

A block comprises low friction sheave with inner hole, a U-shaped frame having two holes on the curved section on the top of the frame, a continuous loop and a lock bone, wherein the sheave and U-shaped frame are connected non-rigidly by the continuous loop, which is inserted through the holes on the curved section on the top of the frame and through the inner hole of the sheave, and the continuous loop and the whole structure of the block are kept together and locked by the lock bone.

6 Claims, 6 Drawing Sheets

(56) References Cited

U.S. PATENT DOCUMENTS

| | | | |
|---|---|---|---|
| 2006/0075794 A1* | 4/2006 | Ling | E05B 71/00 70/58 |
| 2008/0197331 A1* | 8/2008 | Curchod | B66D 3/04 254/390 |
| 2009/0114893 A1* | 5/2009 | Lange | B66D 3/04 254/390 |
| 2009/0200530 A1* | 8/2009 | Curchod | B63H 9/08 254/390 |
| 2016/0152452 A1* | 6/2016 | Barnet | B63B 21/04 254/390 |

* cited by examiner

BLOCK

PRIORITY

This application claims priority of European patent application number EP17020399.6 which was filed on Aug. 31, 2017, the contents of which are incorporated herein by reference.

FIELD OF THE INVENTION

The present invention relates to the field of blocks and pulleys, more specifically to the field of fastening, guiding and hoisting means for yachts and boats and more specifically for sheet lines, runners or masts of yachts and boats.

BACKGROUND OF THE INVENTION

Pulley and block mechanisms are well known already for several centuries. The main problem regarding the well-known pulleys and blocks is excessive friction and that in extreme weather conditions unexpected forces from different directions put the pulley or block mechanisms under high pressure, which cause often breakage of the pulley or block mechanism. Such type of known pulleys and blocks are described for example in the following documents.

The United States patent U.S. Pat. No. 8,002,244B2 describes high load lightweight block construction and connection system for use in sailing boats including a sheave mounted for rotation about a hollow axle; at least one length of flexible material forming at least one discontinuous loop extending through the hollow axle and around the sheave, whereby a tensile load may be transferred from one length to the sheave via the hollow axle, and one discontinuous loop having first and second ends, wherein the first end includes a head assembly, which includes an eye and a pin located within the eye. The problem of this solution is that it has a number of assembling elements and connections between the elements of the block, which makes the whole construction weak. The sheave fixed between the cheeks, the cheeks of the block and additional fixing means of the rope work under pressure, which makes the block construction weaker. In extreme conditions, the whole construction of the block may break into pieces.

French patent application FR2923451A1 describes a block for sailing boats having fixed sheave with ball bearings between the cheek elements, wherein the cheek elements are fixed with additional fastening means. In extreme conditions, the cheek elements and additional fastening means work under pressure, which makes the block construction weaker and the block may break into pieces.

The United States patent application US20160152452A1 describes a pulley for redirecting rope comprising number of elements including a fixed sheave and additional assembling elements need also additional assembling means. In extreme conditions, the pulley construction works under pressure, which makes the construction weaker and the pulley may break into pieces.

None of the known solutions allow moving the construction elements in 3D directions, because several construction elements of pulley or block are either rigidly fixed with each other or fixed with additional fastening elements like screws and clamps. The sheave of known solutions is fixed; moving it may cause the block to fail. The loop angle from the sheave of the known solutions is also fixed. In loose conditions additional cheeks or fixing are needed to keep the turning rope in piece. Due to the closed structure, the block is not ventilated and is harder to maintain. Due to complex shape and fixed structure, the block cannot be used as a snatch block. As the known blocks consist of many different parts under different angles of loading with extra connections, the risk of breaking into pieces is high.

SUMMARY OF THE INVENTION

The object of the present invention is to provide a block mechanism which is durable in extreme weather conditions by bearing heavy loads and forces.

The object of the invention is achieved by flexible block construction, wherein the elements of the block stay in conjunction by the pressure of the load and reduced friction.

The block according to the present invention has been made as one kit with a soft loop to achieve the best usages and connection as one homogeneous structure.

Differently from the solutions known in the prior art the present block is formed of 4 elements with no additional fixing details, no assembling parts or additional attachment elements needed to connect and fix the block elements. The sheave is free to move in a three-dimensional manner in any direction and does not harm the structure. The manufacturing cost are lower due to less parts and no assembling time. Continuous loop angle compared to the longitudinal sides of the sheaves does not have to be wider than the sheave. The present block and its elements are connected without any additional fixing needed in loose conditions.

Turning rope is fixed even in loose situation with no additional parts or shape needed. Due to pen structure, the block is constantly ventilated and easier to maintain and the block can be easily used as a snatch block pulling one side of the loop through the hole opening the passage to attach the turning rope.

As the block consists of only 4 parts without any assembling details and any extra connection in different angles of loadings, especially in extreme conditions the block according to the present invention is more durable than the prior art solutions.

The block according to the present invention is meant to be used in the situation where the overall conditions when using the block are constantly changing—the load direction and angle, block angles, the loading strength, vibration. As the block has no additional assembling details or parts (all details are structural), it gives the block extra strength in rough conditions.

BRIEF DESCRIPTION OF THE DRAWINGS

The invention will now be described in more detail with reference to the following figures from which.

DETAILED DESCRIPTION OF THE INVENTION

Figure 1:
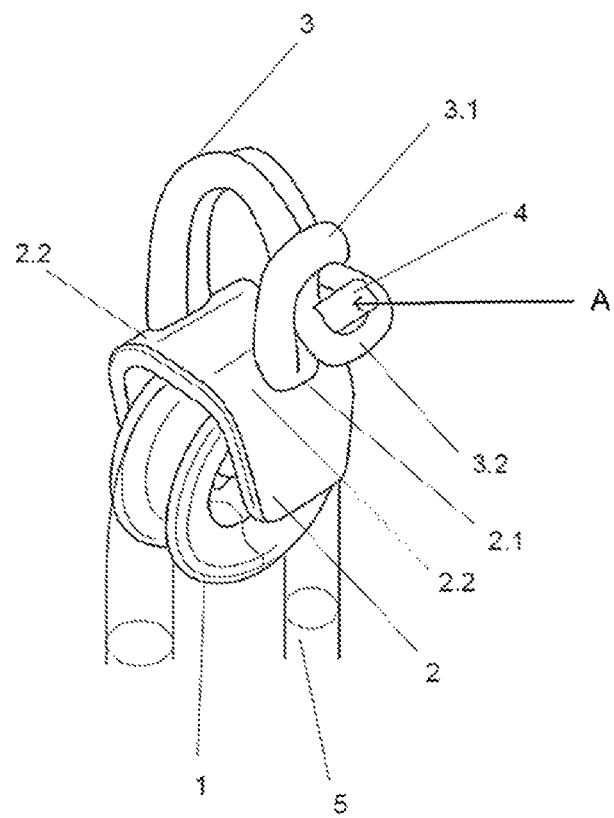
FIG. 1 illustrates the block according to the present invention in perspective view with element (A) indicating the lock bone, shown in FIG. 2 in an enlarged view
Figure 2:
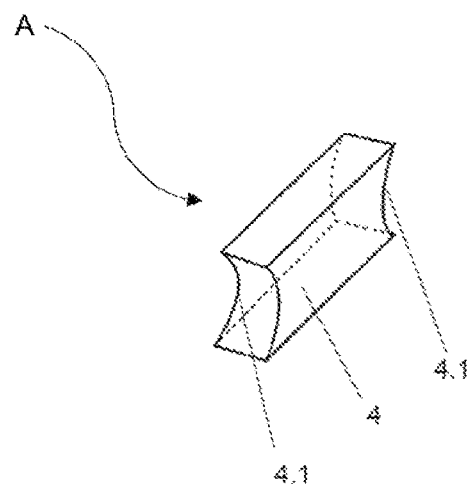
FIG. 2 shows the lock bone of FIG. 1, shown as (A), in an enlarged view.
Figure 3:
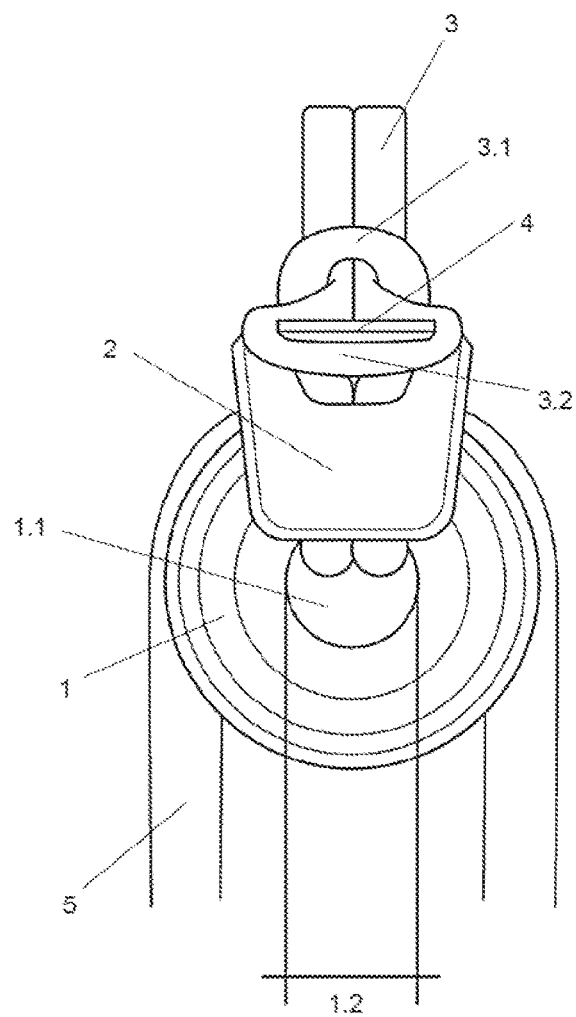
FIG. 3 is the block shown in FIG. 1 as a side view.
Figure 4:
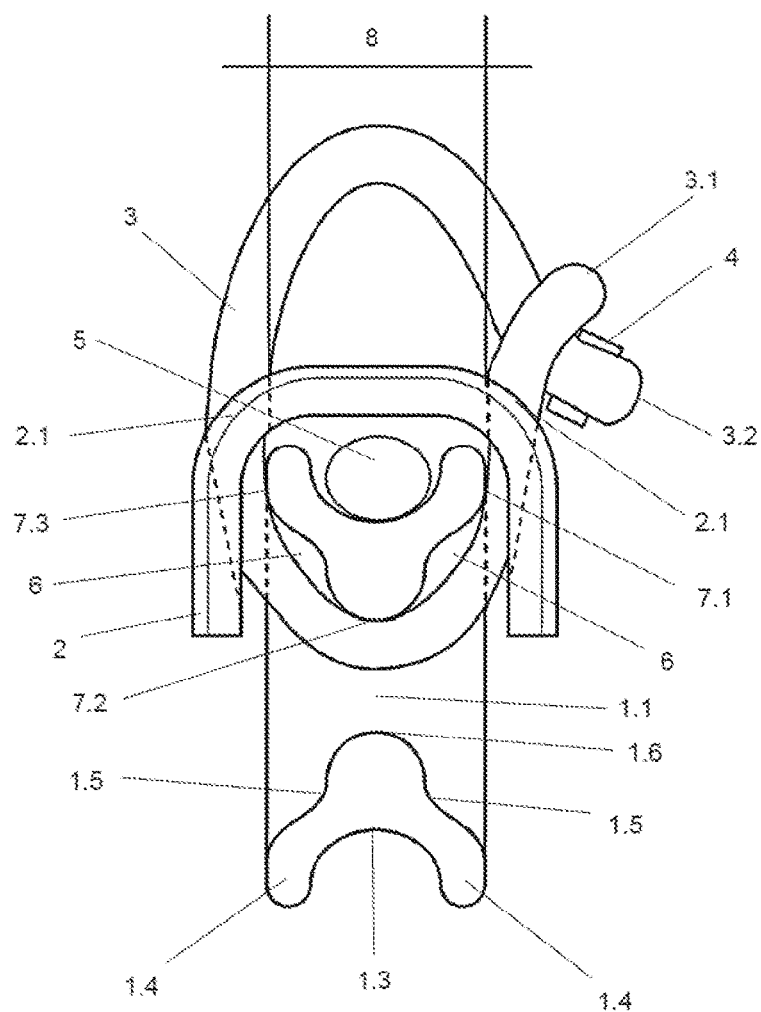
FIG. 4 is a cross-section of the block shown in FIG. 1.
Figure 5:
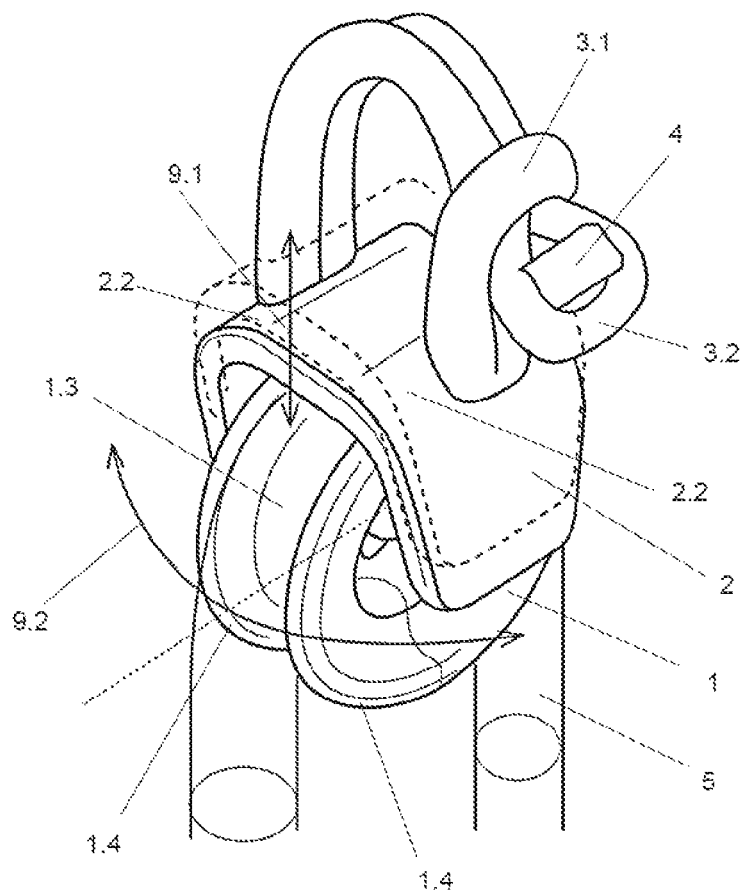
FIG. 5 and FIG. 6 show the movement of the frame and sheave of the block shown in FIG. 1.
Figure 6:
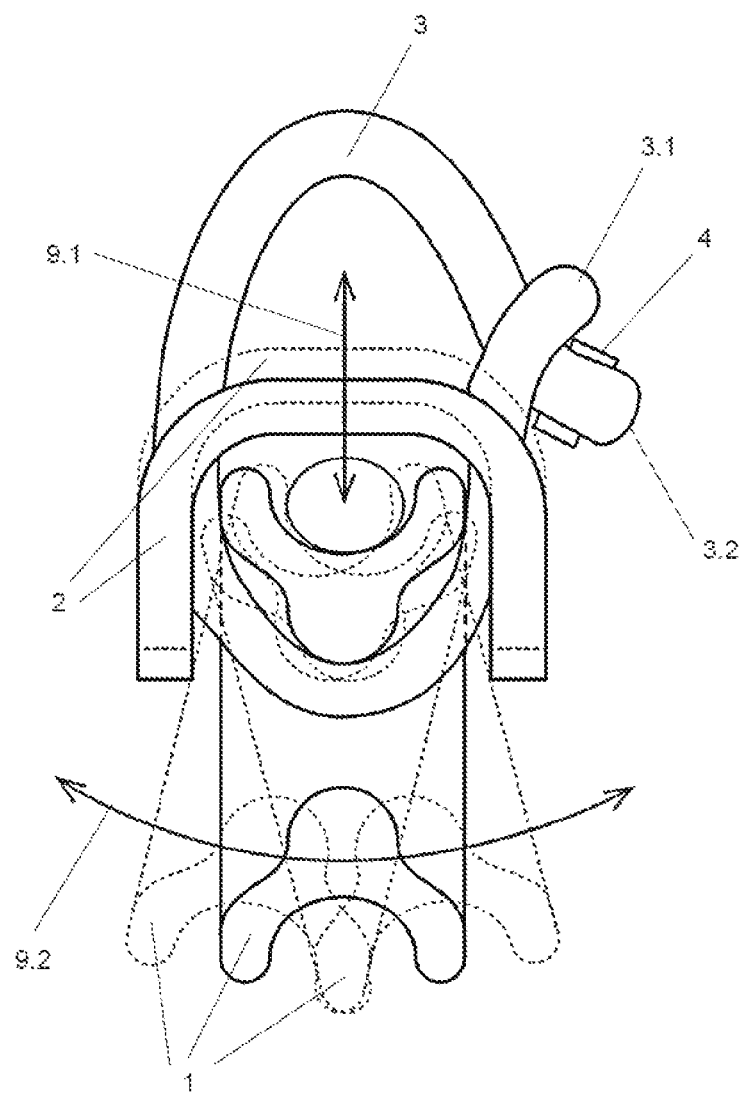

The block according to the present invention comprises non-rigidly connected a triangular low-friction sheave 1 with an inner hole 1.1, a U-shaped frame 2 having two oval shaped holes 2.1 on the curved section 2.2 on top of the U-shaped frame 2, a continuous loop 3 extending through the holes 2.1 of the frame 2 and through the inner hole 1.1 of the sheave 1, and a lock bone 4 holding together the sheave 1, the U-shaped frame 2 and the continuous loop 3.

The low friction sheave 1 has a section of triangular rounded shape, which comprises an outer channel 1.3, longitudinal sections 1.4, negative curved inner section 1.5 forming cooling chambers 6 between the sheave 1 and the continuous loop 3, and positive curved inner section 1.6. The diameter 1.2 of the inner hole 1.1 of the sheave 1 is about two to three, preferably 2.5 times greater than the diameter of the continuous loop 3 to give the stability and lowest friction for the spinning sheave. Negative curved inner sections 1.5 work as cooling chambers 6 for the continuous loop 3.

The function of the U-shaped frame 2 is to prevent the rope 5 wearing off from the outer channel 1.3 of sheave 1 under low loading or in different loading directions. The U-shaped frame 2 moves flexibly with a direction of different loading angles 9.2.

The U-shaped frame 2 has two oval shaped holes 2.1 which are situated on the curving section 2.2 on the top of the U-shaped frame 2. The inner distance 8 between the holes 2.1 is exact with the width 8 of the triangular low friction sheave 1. The lower part of the holes 2.1 is concave.

The continuous loop 3 which is pushed together forms two parallel lines with the first loop end 3.1 and the second loop end 3.2 running through the holes 2.1 of the U-shaped frame 2, wherein the loop 3 and the frame 2 are in indirect contact with each other and the loop 3 is rounding the inner hole 1.1 of the sheave 1 and is indirect contact with the sheave 1 in the first point 7.1, in the second point 7.2 and in the third point 7.3 to gain the lowest friction possible when spinning under loading. As the friction generates heat for the continuous loop 3, the negative curved inner sections 1.5 of the sheave 1 work as cooling chambers 6 for the continuous loop 3.

The continuous loop 3 forms a rounded shape over the object and is flexible giving free movement to each part of the block which is crucial under high loading in different directions and constant movement.

The continuous loop is locked with the lock bone 4 which works as a compression lock giving the rope 5 free movement under loading.

The lock bone 4 is the part which holds the whole flexible structure together. The continuous loop 3 runs through all the elements of the block. One end 3.1 of the loop goes through the other end 3.2 of the loop and over the lock bone 4. The lock bone 4 is not fixed to the loop because there is no loading discontinuity along the loop fiber directions. Also, the lock bone will find its best position under loading. The lock bone works under pressure under the load making the whole structure fixed. The lock bone 4 is a parallel-piped shape with concave edges 4.1 on both shorter sides. This particular shape allows flexible movement for the loop 3 and fixes all elements of the whole block structure even with low loadings when each element of the block is loosened. There is no fixed connection between each detail of the block and the structural steadiness is achieved under loading with the use of lock bone 4.

The sheave 1 of the block moves three-dimensionally while spinning. The low friction spinning is achieved due that the rope axle has moved as close to the center of the sheave as possible, making the friction lowest possible. Due to this, the sheave 1 will always spin as the rope, which turns the sheave, has always a larger friction area.

The movability of the sheave 1 is achieved by minimizing the rope axle friction lower than the friction of the rope which makes the sheave move/spin.

The U-shaped frame 2 of the block is movable three-dimensionally: vertically as well as turning also on a horizontal level according to the movement of the sheave following the loading direction and angle.

The movability of the U-shaped frame 2 is achieved by not fixing block elements between the loop and U-shaped frame. The frame moves vertically as the rope loop goes through the oval holes freely, leaving the frame free to slide up and down on the rope loop. The U-shaped frame fixes its best position only when the load is applied to the block. Still, the U-shaped frame can move minimally according to the stress and loading direction when under load in working conditions.

The sheave 1 of the block and the U-shaped frame 2 of the block in a relation to each other are not fixed in loose conditions. The sheave can move three-dimensionally inside the U-shaped frame. The U-shaped frame can move up and down vertically in loose conditions. The U-shaped frame and the sheave will take the best fixed position only when load is applied. The U-shaped frame and the sheave can still move minimally according to the stress and loading directions when under maximum load.

The movability of the sheave 1 of the block and the U-shaped frame 2 enables the block and its elements to be flexible in a loose situation and under loading. When the loading is applied the elements will take the best possible positions maximizing the durability of the block in different working situations under unexpected loading conditions. Due to these solutions the block according to the present invention is basically unbreakable as it does not have any rigid connections or details which could bend, deform or break to pieces. The block and its elements will always take the best possible position according to the load applied. With the present invention it is achieved that the block does not have any additional assembling parts, rigid axles, fixed cheeks and additional connections points. This solution makes the block the lightest, simplest and most flexible block compared to prior art.

The invention claimed is:

1. A block comprising:
   a sheave with an inner hole;
   a U-shaped frame having two holes on a curved section on top of the frame;
   a continuous loop; and
   a lock bone,
   wherein the sheave and the U-shaped frame are connected non-rigidly by the continuous loop, which is inserted through the holes on the curved section on the top of the frame and through the inner hole of the sheave, and
   wherein the lock bone holds together the sheave, the U-shaped frame and the continuous loop.

2. The block according to claim 1, wherein the sheave has a section of triangular rounded shape comprising
   an outer channel; longitudinal sections; negative curved inner section, and positive curved inner section,
   wherein between the longitudinal sections, negative curved inner section and positive curved inner section of sheave and continuous loop, cooling chambers are formed.

3. The block according to claim 1, wherein the inner hole of the sheave has a diameter two to three times greater than a diameter of the continuous loop.

4. The block according to claim 1, wherein the holes of the frame are located from each other at a distance which equals a width of the sheave.

5. The block according to claim 1, wherein the continuous loop circumscribes the sheave through the holes of the U-shaped frame and through the inner hole of the sheave by being in indirect contact with the sheave in a first point, in a second point and in a third point.

6. The block according to claim 1, wherein the lock bone has a parallel-pipe shape having concave edges on both of its shorter sides.

* * * * *